*Robert King's Impt in Helical Wire Brushes.*

*Re-issue.*

4442

REISSUED JUN 27 1871

*Witnesses:*
Fred Haynes
R. R. Raveau

Robt King

AM. PHOTO-LITHOGRAPHIC CO. N.Y. (OSBORNE'S PROCESS.)

UNITED STATES PATENT OFFICE

ROBERT KING, OF BROOKLYN, ASSIGNOR TO T. PROSSER & SON, OF NEW YORK, N. Y.

IMPROVEMENT IN BOILER-FLUE BRUSHES.

Specification forming part of Letters Patent No. 60,013, dated November 27, 1866; reissue No. 4,442, dated June 27, 1871.

*To all whom it may concern:*

Be it known that I, ROBERT KING, of Brooklyn, in the county of Kings and State of New York, have invented a certain new and useful Improvement in Helical Wire Brushes, of which the following is a full, clear, and exact description, reference being had to the accompanying drawing forming part of this specification, and in which—

Figure 1:
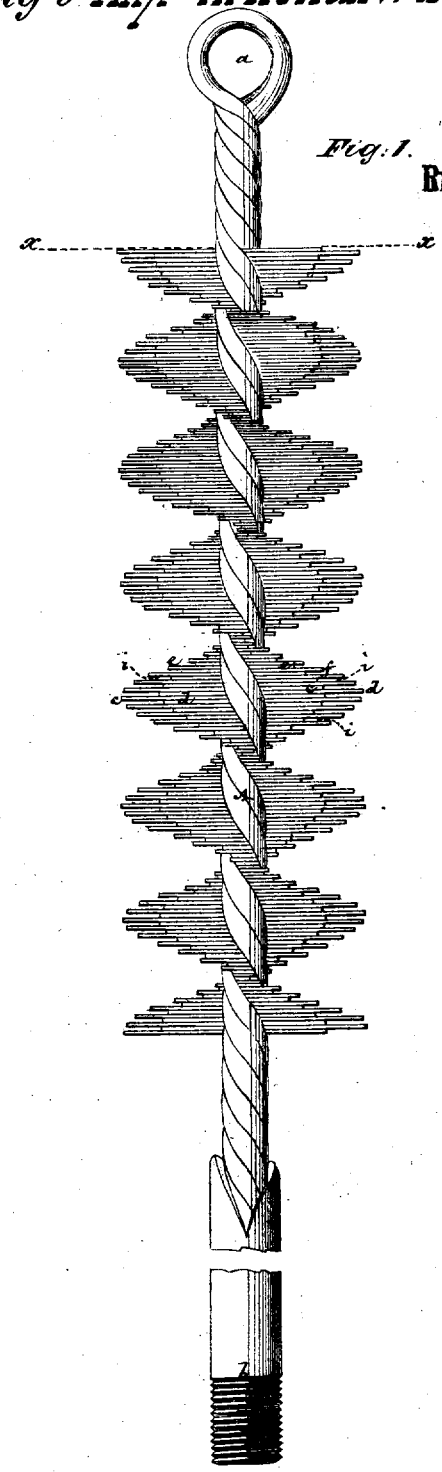
Figure 2:
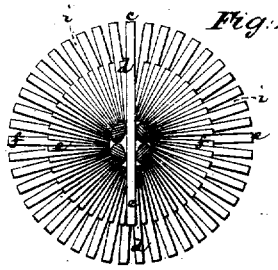

Figure 1 represents a longitudinal view of a helical wire brush in illustration of my improvement; and Fig. 2 a transverse section thereof, taken as indicated by the line *x x* in Fig. 1.

Like letters refer to like parts in both figures.

The helical wire brushes commonly used for cleaning out boiler-tubes have heretofore been constructed with all the brushing-wires projecting equally from the core in such manner that the contiguous ones are in contact throughout their whole length, and are so mutually supporting to their ends as to be permitted to exercise very little flexibility. In fact, they resemble very much a continuous flange, which will not yield with the freedom necessary to a proper brush-like action. The object of this invention is to provide the requisite flexibility; and to this end it consists in the construction and arrangement of the wires to project unequally from the core in such manner that at their ends, and to some distance therefrom toward the core, they present alternate wires and intervening spaces, and room is afforded between them for the exercise of their flexibility.

The accompanying drawing represents one construction and arrangement of the wires, by which the brush is made to present the alternate wires and spaces.

A is the core or stock, formed of twisted wire or strands in the usual manner, and provided with an eye, *a*, at one end and screw-shank *b* at the other, to operate the brush as helical brushes are usually worked. The core A has inserted through it, in the form of a helix, in the usual manner, the steel strips or wires *c c*, *d d*, *e e*, *f f*. These are, as usual, close together at the point where they intersect the core, and at some distance therefrom, so that they assist in holding each other in place; but spaces *i i* are presented at or between their ends. These spaces are formed by so arranging the wires that they project more from one side than from the other side of the core or stock, so that two adjacent wires form the one a short and the other a long projection from or on the same side of the stock. In this way the flexibility necessary to a brush-like action is allowed to be exercised by the wires in the operation of drawing the brush through the boiler-tubes.

In the example of my invention just described the strips or wires are represented as all of the same length; but this is not essential to the carrying out of the invention.

What I claim as my invention, and desire to secure by Letters Patent, is—

A helical wire brush in which the contiguous wires are constructed and arranged to form alternately long and short projections from or on the same side of the core, and present at their ends alternate wires and intervening spaces, substantially as herein described.

ROBT. KING.

Witnesses:
FRED HAYNES,
R. E. RABEAU.